United States Patent
Acheson et al.

(10) Patent No.: US 11,306,681 B2
(45) Date of Patent: Apr. 19, 2022

(54) SHEARED EXHAUST NOZZLE

(71) Applicant: The Boeing Company, Chicago, IL (US)

(72) Inventors: Kurt E. Acheson, Seattle, WA (US); David F. Cerra, Woodinville, WA (US); Robert H. Willie, Freeland, WA (US)

(73) Assignee: THE BOEING COMPANY, Chicago, IL (US)

( * ) Notice: Subject to any disclaimer, the term of this patent is extended or adjusted under 35 U.S.C. 154(b) by 63 days.

(21) Appl. No.: 16/248,342

(22) Filed: Jan. 15, 2019

(65) Prior Publication Data

US 2020/0224605 A1 Jul. 16, 2020

(51) Int. Cl.
*F02K 1/46* (2006.01)
*F02K 3/06* (2006.01)

(52) U.S. Cl.
CPC .............. *F02K 1/46* (2013.01); *F02K 3/06* (2013.01); *F05D 2260/96* (2013.01)

(58) Field of Classification Search
CPC ..... F02K 1/78; F02K 1/82; F02K 1/46; F02K 1/002; F02K 1/006; F05D 2250/73
See application file for complete search history.

(56) References Cited

U.S. PATENT DOCUMENTS

| | | | |
|---|---|---|---|
| 3,658,279 A | 4/1972 | Robertson | |
| 4,066,214 A | 1/1978 | Johnson | |
| 4,280,587 A | 7/1981 | Bhat | |
| 4,508,270 A | 4/1985 | Joubert | |
| 6,415,598 B2 | 7/2002 | Pinker | |
| 2002/0178711 A1* | 12/2002 | Martens | F02K 1/40 60/226.1 |
| 2008/0121754 A1* | 5/2008 | Marche | B64D 27/26 244/54 |
| 2009/0259379 A1* | 10/2009 | Hurwitz | F02K 1/15 701/100 |

(Continued)

FOREIGN PATENT DOCUMENTS

| | | |
|---|---|---|
| CN | 208310917 | 1/2019 |
| EP | 1690790 | 8/2006 |
| FR | 911269 | 7/1946 |

OTHER PUBLICATIONS

Extended European Search Report dated Jun. 23, 2020 for European Patent Application No. 19218672.4.

(Continued)

*Primary Examiner* — Andrew H Nguyen
(74) *Attorney, Agent, or Firm* — Gates & Cooper LLP

(57) ABSTRACT

Conventional commercial engine exhaust systems are defined with axi-symmetric surfaces (e.g., conical or nearly conical surfaces), which create an annular exhaust for the fan (bypass) nozzle of roughly constant duct-height around the circumference. In one example configuration, the fan sleeve has been sheared upward (towards the wing or pylon) causing a larger area and duct height near the pylon relative to the portion away from the pylon. For a given thrust generated by the turbofan engine housed in the nacelle, the shear toward the pylon mount realigns the thrust in the direction of flight which may, in some examples, reduce noise experienced downstream of the turbofan engine and decreases fuel consumed in the engine core.

21 Claims, 14 Drawing Sheets

(56) References Cited

U.S. PATENT DOCUMENTS

2011/0014045 A1* 1/2011 McCall ................... F02K 1/78
　　　　　　　　　　　　　　　　　　　　　　　　415/227
2016/0144966 A1* 5/2016 Trahmer .................. B64C 9/16
　　　　　　　　　　　　　　　　　　　　　　　　244/13

OTHER PUBLICATIONS

An, C.H., et al., "Analysis of Plume Infrared Signatures of S-Shaped Nozzle Configurations of Aerial Vehicle", Journal of Aircraft, May 2016, pp. 1-28, vol. 53, No. 6.

Gilyard, G.B., et al., "Optimal Pitch Thrust-Vector Angle and Benefits for all Flight Regimes", National Aeronautics and Space Administration, Mar. 2000, See eg. pp. 6-7.

* cited by examiner

SHEARED EXHAUST NOZZLE

BACKGROUND

1. Field

The present disclosure relates to an exhaust system for an aircraft turbofan engine.

2. Description of the Related Art

FIG. 1 is a schematic view of an exemplary aircraft engine pod 60. Engine pod 60 includes a nacelle 62, a fan 64, a compressor 66, a combustor 68, and a turbine 70. Engine pod 60 is typically attached to the wings or fuselage of an aircraft through appropriate mountings, for example, a pylon 71. Nacelle 62 includes an engine inlet 72 having an outer barrel 74 and an inner barrel 76, and a lip section joining the two. In the exemplary implementation, the inner barrel 76, along with a lip section, defines an air intake duct 78 for supplying air 55 to the fan 64, which subsequently is directed both to the bypass duct and engine core, comprising the compressor 66, combustor 68 and turbine 70. FIG. 2 is an end view of the engine pod 60 illustrating the external nacelle 202, fan duct 200 outer flow surface OFS, a fan duct inner flow surface IFS, an aft cowl 204 comprising an extension of the IFS beyond an aft station of the OFS, a core nozzle 205, and the plug 206 at maximum diameter, where each of the plug 206; core nozzle 205, aft cowl 204, OFS, and external nacelle 202 are concentrically nested about a longitudinal axis AA of the engine pod 60. Also shown are locations of the Fan exhaust flow 210 and primary flow 212 (also known as core exhaust flow).

Operating a commercial aircraft can be challenging in view of increased or unpredictable fuel prices and/or noise restrictions at airports. What is needed is are methods to increase fuel efficiency and/or reduce the jet noise contribution to community noise for high power (i.e., takeoff) operation around the airport. The present disclosure satisfies this need.

SUMMARY

The present disclosure describes an engine including a nacelle having an inlet and an exhaust; a fan duct between the nacelle and an engine core housed in the nacelle, wherein the nacelle forms an outer wall (comprising outer flow surface OFS) of the fan duct; a casing of the engine core and an aft cowl form an inner wall (comprising inner flow surface IFS) of the fan duct; and an exit station of the OFS has a curved portion having a curvature so that the IFS and the OFS shift exhaust gas exiting the exhaust towards a longitudinal axis of the engine so as to fill an area behind the engine and counteract deflection of the exhaust gas caused by a pylon attached to the nacelle. In one or more embodiments, the curvature is controlled to contribute, at a given thrust generated by the turbofan engine, to community noise reduction experienced downstream of the engine and engine performance maximization (e.g., reduction in the fuel consumed in the engine housed in the nacelle).

The curvature of the curved portion can be embodied in many ways including, but not limited to, the following.

1. The curvature such that a first distance D1 (e.g., slant height) between a first point (P1) on the OFS, and a second point (P2) on inner flow surface (IFS), is larger or longer than a second distance D2 (e.g., slant height) between a third point (P3) on the OFS and a fourth point (P4) on the IFS. The first distance D1 is on an attach side of the pylon (i.e., in a first region R1 between the pylon and a core exhaust connected to the engine core) and the second distance D2 is in a second region R2 between the core exhaust and a section of the external nacelle (comprising the outer surface of the nacelle) that faces away from the aircraft. In one or more examples, the first point, the second point, the third point, and the fourth point are collinear.

2. The engine of embodiment 1 wherein the curved portion includes a first shift in a position of the first point, P1, by approximately 1-2% of a diameter of the exhaust, as measured at the trailing edge of the exhaust, and a second shift in a position of the third point, P3, by approximately 1-2% of the diameter of the exhaust, as measured at the trailing edge of the exhaust, wherein the shifts are relative to the case where the core exhaust (e.g., core nand the exhaust (e.g., fan nozzle) are concentric. D1 is 1-2% longer and D2 is 1-2% shorter relative to what D1 and D2 would have been had the core nozzle been centered on the engine's longitudinal axis or center line.

3. The engine of embodiments 1 or 2, wherein the nacelle comprises an external nacelle having a length L1, as measured in a direction parallel to the engine's longitudinal axis AA', and the curved portion is entirely within the last 25% of the length L1 of the external nacelle.

4. The engine of embodiments 1, 2, or 3, wherein the exhaust comprises a shear, or offset, of the fan duct outer wall so as to form the curved portion.

5. The engine of embodiments 1, 2, 3, or 4, wherein the curved portion increases alignment of a thrust vector of the thrust in an aft-facing direction parallel to a longitudinal axis of the engine so that the thrust deflected (e.g., down) by the pylon is shifted back towards or parallel to the longitudinal axis of the engine.

6. The engine of one or any combination of embodiments 1-5, wherein the pylon attaches the nacelle to a wing.

7. The engine of one or any combination of embodiments 1-6, wherein the pylon attaches the nacelle to a fuselage or an empennage.

8. In another example, an exhaust for a nacelle comprises a curved portion that shifts flow of gas exiting through the exhaust in a direction that counteracts displacement of the flow by a mounting structure (e.g., pylon) attached to the nacelle. The exhaust can be embodied in many ways including, but not limited to, the following.

9. The exhaust of embodiment 9 comprising a nozzle including the curved portion so that, when the nozzle is disposed around a body and the flow of the gas between the nozzle and the body is bounded by an outer flow surface on the nozzle and an inner flow surface on the body:
   a. a first distance between a first point on the outer flow surface and a second point on the inner flow surface is longer than a second distance between a third point on the outer flow surface and a fourth point on the body;
   b. the mounting structure comprising a pylon attached to the nacelle is closer to the first point than the third point;
   c. the flow of the gas outputted from the nozzle is shifted in the direction counteracting deflection of the gas away from the pylon and caused by the pylon during flight and/or take-off of an aircraft propelled using the nozzle.

10. The exhaust of embodiments 8 or 9, wherein the pylon is configured to attach the nacelle to a wing.

11. The exhaust of embodiments 8 or 9, wherein the pylon is configured to attach the nacelle to a fuselage or an empennage.

12. The exhaust of claim embodiments 8, 9, 10, or 11 wherein the curved portion increases alignment of the flow of the gas in an aft direction parallel to a longitudinal axis of an engine comprising the nozzle.

13. The exhaust of embodiments 9, 10, 11, or 12, wherein the nozzle is a fan nozzle in a turbofan engine and the curved portion includes:

a first shift in a position of the first point by 1%-2% of a diameter of the nozzle, as measured at an trailing edge of the nozzle, and a second shift in a position of the third point by 1%-2% of the diameter of the nozzle, as measured at the trailing edge of the fan nozzle.

14. In another example, an exhaust for a nacelle, comprises a nozzle including a first curved surface curving away from a longitudinal axis of the nacelle on a first side of the nozzle and a second curved surface curving towards the longitudinal axis on a second side opposite the first side, wherein:

a. the first curved surface has a first radius of curvature,
b. the second curved surface has a second radius of curvature,
c. the first radius of curvature and the second radius of curvature both lie in a plane forming a cross section through the nozzle and a pylon attached to the nacelle,
d. the first radius of curvature is larger than the second radius of curvature, and
e. the first side is on a side of the plane closer to the pylon attached to the nozzle.

15. The exhaust of embodiment 14, wherein the first curved surface and the second curved surface both shift a trailing edge of the nozzle by 1%-2% of a diameter of the nozzle as measured at the trailing edge.

16. The exhaust of embodiments 14 or 15, wherein the first curved surface and the second curved surface are in a rear half of the nozzle.

17. The exhaust of embodiments 14, 15, or 16, wherein the nacelle includes an external nacelle and the first curved surface and the second curved surface are within a last 25% of a length of the external nacelle.

18. The exhaust of embodiments 14, 15, 16, or 17 wherein the first curved surface and/or the second curved surface shift exhaust gas outputted from the nozzle in a direction counteracting deflection of the exhaust gas caused by the pylon during flight and/or take-off of an aircraft propelled by the nozzle, so as to increase alignment of flow of the exhaust gas from the nozzle in an aft direction parallel to a longitudinal axis of an engine comprising the nozzle.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

Figure 1:
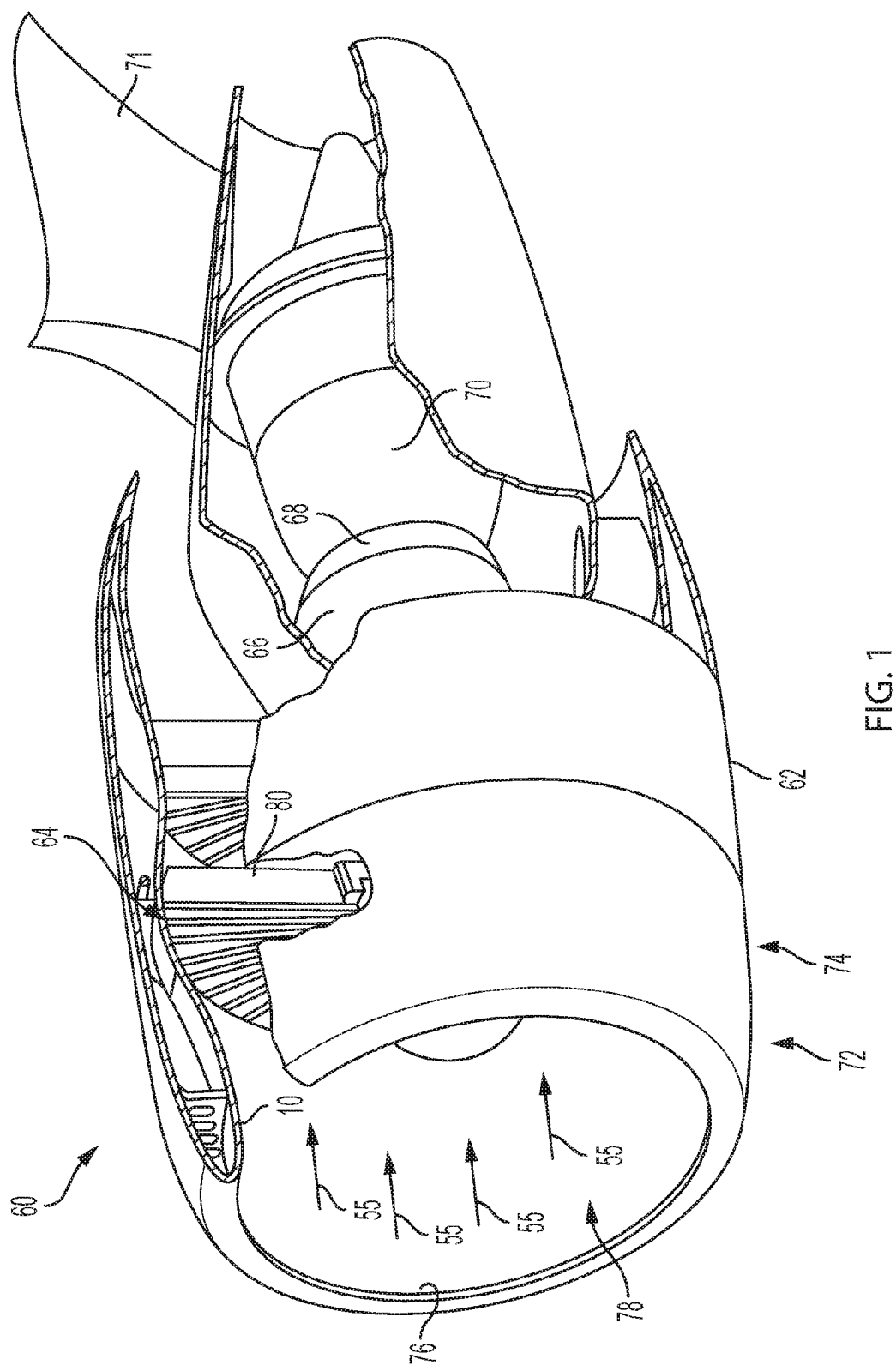
FIG. 1 illustrates a perspective view of a conventional aircraft engine.
Figure 2:
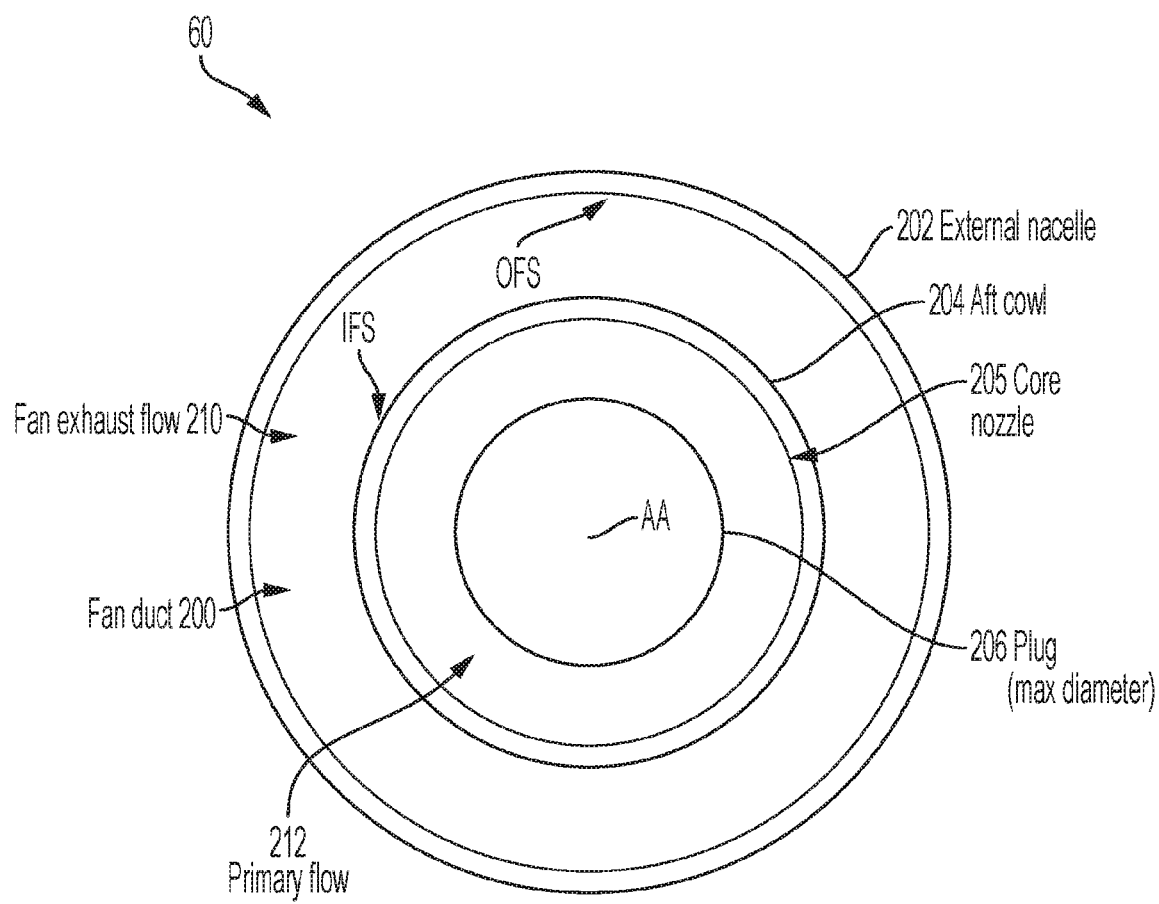
FIG. 2 illustrates a rear view of a conventional aircraft engine.
Figure 3:
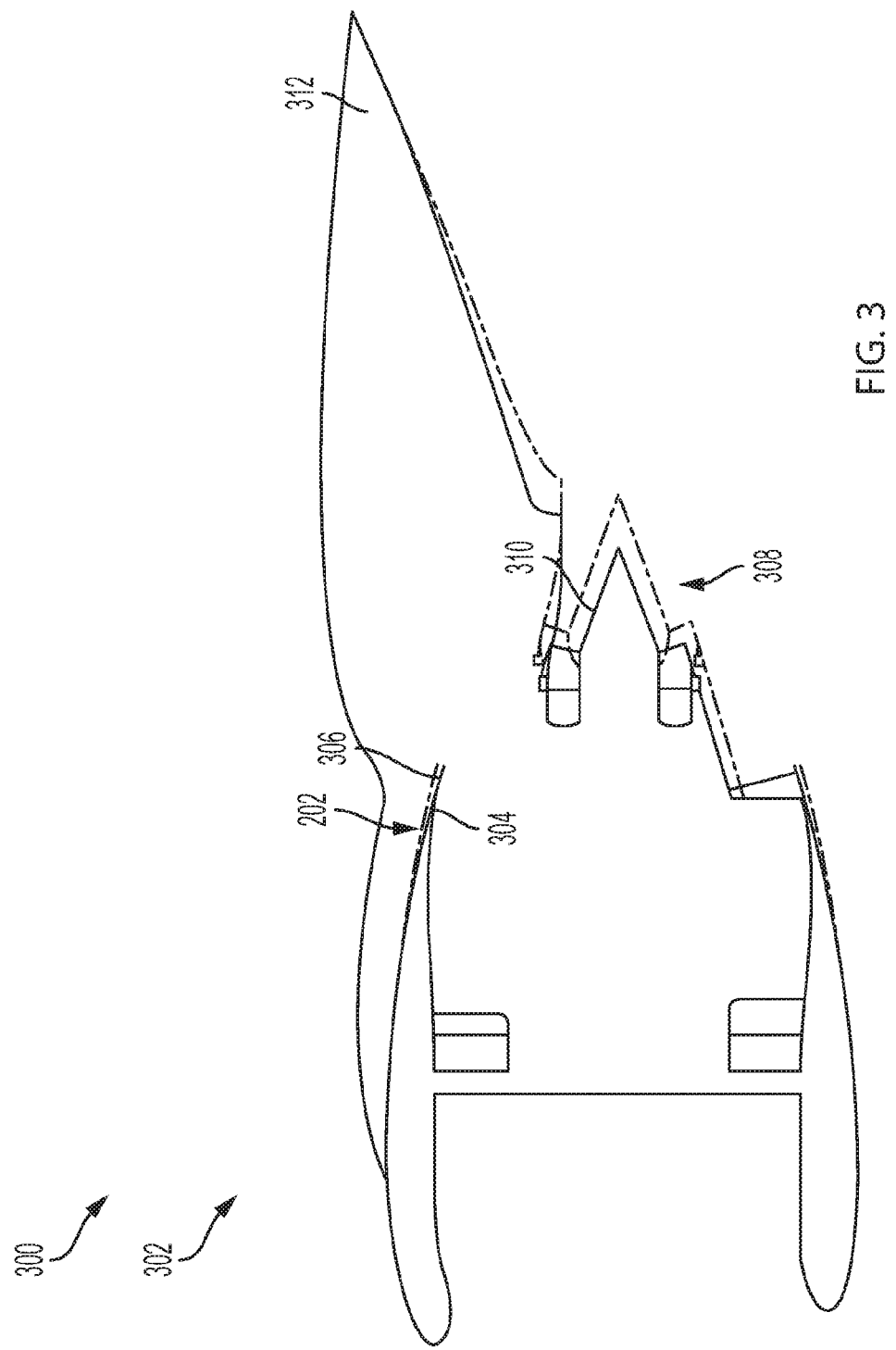
FIG. 3 illustrates a nacelle and engine core wrap for reducing aerodynamic drag.

FIG. 3 illustrates a turbofan engine 300 comprising a nacelle 302 having an inner surface (fan sleeve 304) and an outer surface (external nacelle 306); a core exhaust nozzle 308; a plug 310; and a pylon 312 for attaching the turbofan engine to a wing. In the illustrated design for a conventional engine, the nacelle forming a tight wrap (solid line in FIG. 3) about the engine core reduces aerodynamic drag and increases net thrust of the turbofan engine. However, for a geared turbofan engine, less turbine stages are needed and the engine can be made shorter. In such shorter engine examples, the nacelle exterior must aggressively close out in order to maintain the tight wrap about the engine (and because the turbine diameter is small relative to the fan diameter). Using an optimal axisymmetric nozzle together with the aggressive close out (dashed line in FIG. 3) of the nacelle exterior can cause undesirable flow separation (turbulence) of air flowing about the engine as well as an increase in nacelle drag. Therefore, for shorter turbofan engines with large diameter fan (e.g., ultra high bypass engines such as, but not limited to, geared fan engines), a nacelle with a benign boat-tail provides optimal drag levels. However, this benign boat-tail (nacelle aft body) leads to difficulty in lofting optimal nozzle geometries while maintaining desirable drag performance for the thrust reversers and fan cowl. Moreover, while the above described integration-performance challenge can be solved by increasing the radius of the exhaust system, this is generally detrimental to the performance of the exhaust system due to the added wetted area of the nozzle.

Figure 4:
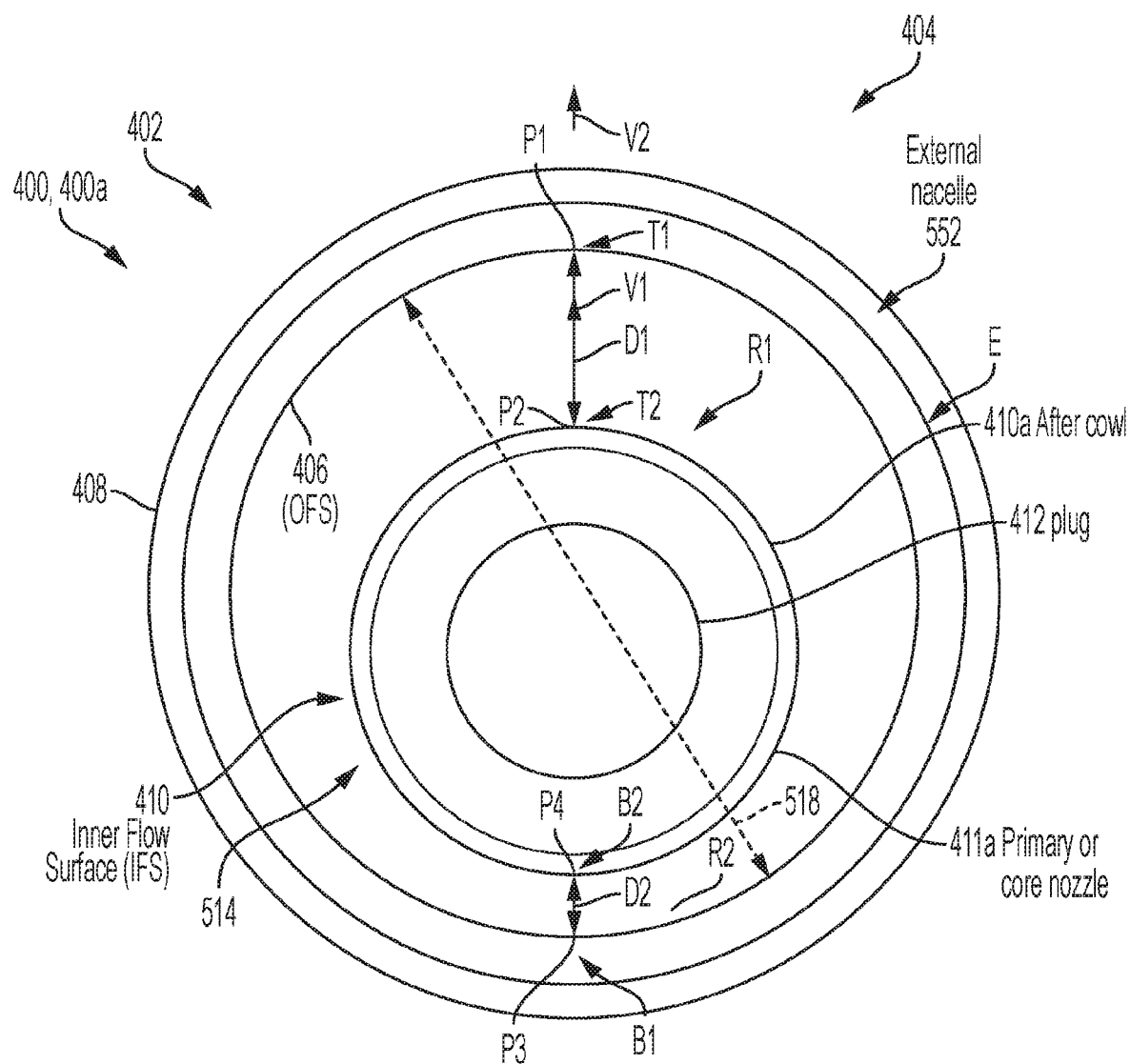
FIG. 4 is a rear cross-sectional view of a turbofan engine including a nacelle having a curved portion according to one or more examples described herein.

FIGS. 4 and 5 illustrate an exhaust 400 (e.g., comprising fan nozzle 400a) for a nacelle 402 that overcomes the problems described above. The exhaust 400 comprises an outer sleeve 404 including an outer flow surface (OFS) 406 of the fan duct 514 and an outer surface 408 of the nacelle 402. FIG. 4 further illustrates an inner flow surface (IFS) 410 of the fan duct 514. Also illustrated is a plug 412 having a maximum diameter similar to the diameter of the core nozzle 411a. The region between the core nozzle 411a and the plug 412 comprises the primary duct 411b. IFS includes a surface of an aft cowl 410a comprising a fairing for the core nozzle 411a.

An aft/aftmost section or exit station of the OFS 406 includes a curved portion 502 (e.g., bend) so that a first distance D1 between a top T1 of the OFS 406 and a top T2 of the IFS 410 is larger or longer than a second distance D2 between a bottom B1 of the OFS 406 and a bottom B2 of the IFS 410. The first distance D1 is in a first region R1 between the pylon and the core exhaust 411 and the second distance D2 is in a second region R2 between the core exhaust 411 (comprising core nozzle 411a) and a section S6 of the outer surface facing away from the aircraft 900a, 900b (referring also to FIGS. 9A and 9B).

Figure 5A:
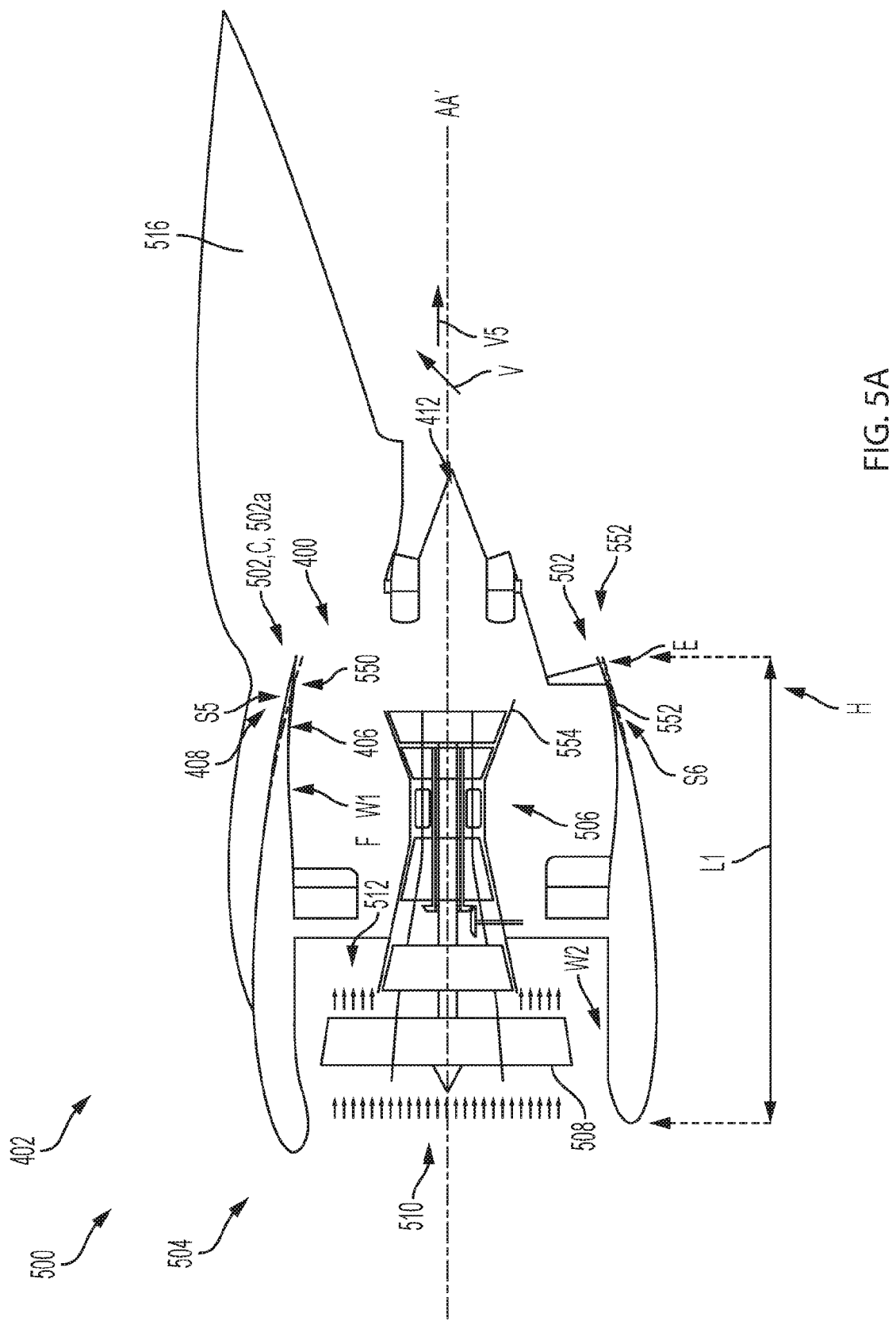
FIG. 5A is a side view of the turbofan engine including the nacelle having a curved portion according to one or more examples described herein, wherein the curved portion is curved less on the pylon side and more on the opposite side.

FIG. 5A is a side view of a turbofan engine 500 including the nacelle 402 comprising the exhaust 400 and an inlet 504. An engine core 506 is housed in the nacelle 402, the engine core 506 comprising or connected to the core exhaust 411; and the aft cowl 410a forms a fairing around the core exhaust 411. A fan 508 is housed in the nacelle so as to draw a first portion of air 510 through the inlet 504 into the engine core 506 and draw a second portion the air 512 through the inlet 504 into a fan duct 514 between the engine core 506 and the nacelle 402. As described herein, the nacelle 402 forms an outer wall W1 (comprising outer flow surface OFS) of the fan duct 514; and a casing 554 of the engine core 506 and an aft cowl 410a form an inner wall W2 (comprising inner flow surface IFS) of the fan duct 514, so that the OFS 406 and the IFS 410 bound the flow F of the second portion of the air 512. The curved portion 502 is illustrated as the solid line in FIG. 5A (the dashed line represents the exhaust without the bend).

The first portion of air 510 is used to burn fuel in the engine core 506 so as to form exhaust gas (primary flow) exhausted through the core exhaust 411 and generating a first component of engine thrust. The primary flow is bounded by the inner side of the aft cowl (extension of the IFS) and the plug. The second portion of air 512 is exhausted through the exhaust 400 and generates a second component of engine thrust. Also illustrated is pylon 516 attached to a first section S5 of the outer surface 408, wherein the pylon 516 is for attaching the nacelle 402 to a wing. Pylon 516 includes an aerodynamic surface or fairing covering the pylon 516 and can be attached to the fan case (in which case the fairing extends towards the inlet 504 as illustrated) or the engine core. The curved portion 502 comprising the bend or shear is illustrated as the solid line in FIG. 5A (the dashed line represents the exhaust without the curved portion).

Figure 5B:
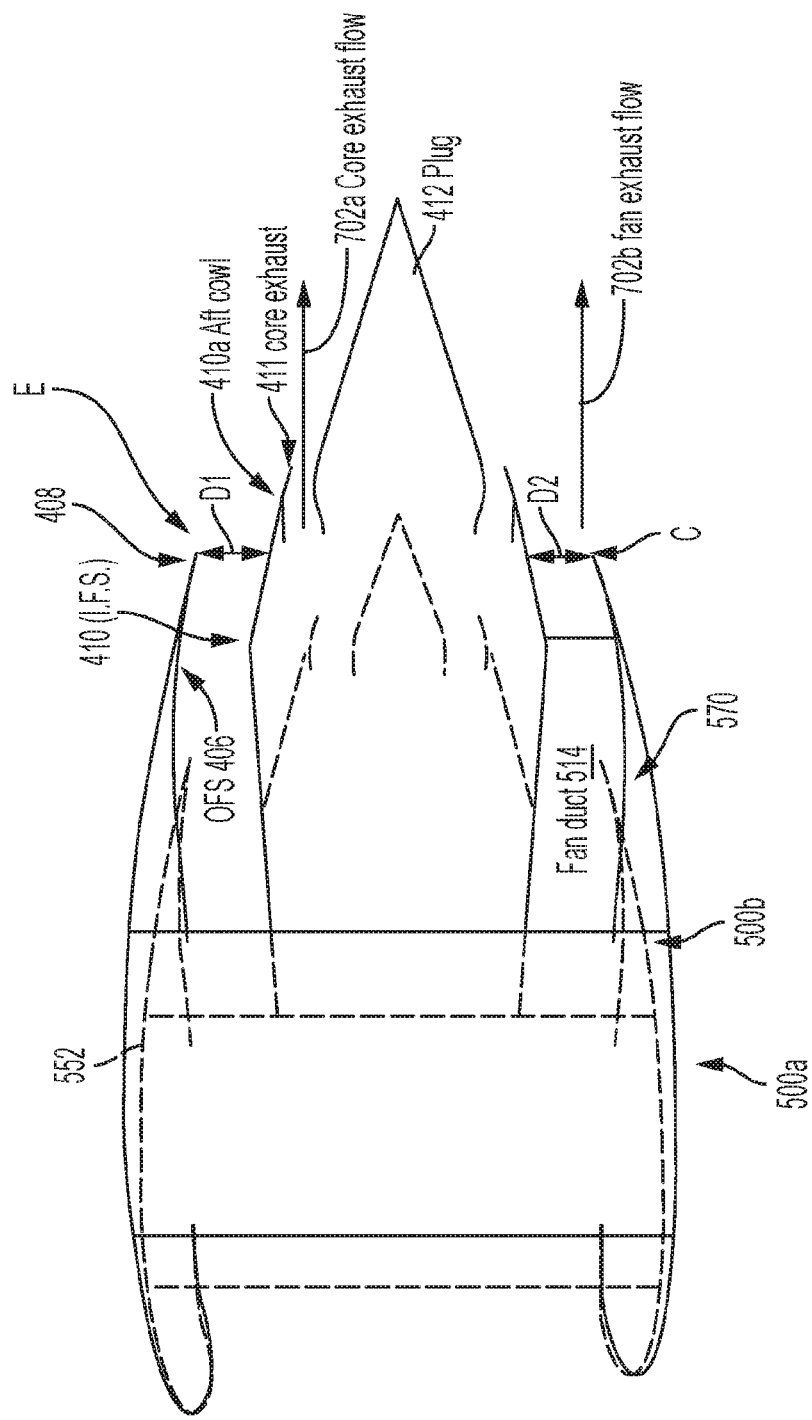
FIG. 5B is a side view of illustrating a geared turbofan engine (dashed line) relative to a direct drive turbofan engine (solid line).

FIG. 5B is a side view illustrating a direct drive turbofan engine 500a (solid line) and a geared turbofan engine 500b (dotted line) comprising the OFS 406 having a curved portion 502, the IFS 410, and aft cowl 410a comprising an extension of the IFS 410 surface beyond the aft station of the OFS 406. The aft cowl serves as the outer cover for the primary nozzle (e.g., core nozzle 411a).

As illustrated in FIG. 5B, the geared turbofan engine 500b is shorter with fewer engine stages, and also has a smaller engine core, as compared to the direct drive turbofan engine 500a. The external nacelle 552 for the geared turbofan engine 500b must close out faster, and to a smaller engine core, resulting in a steeper boat-tail 570 closeout that presents the risk of increased drag due to flow separation.

Figure 5C:
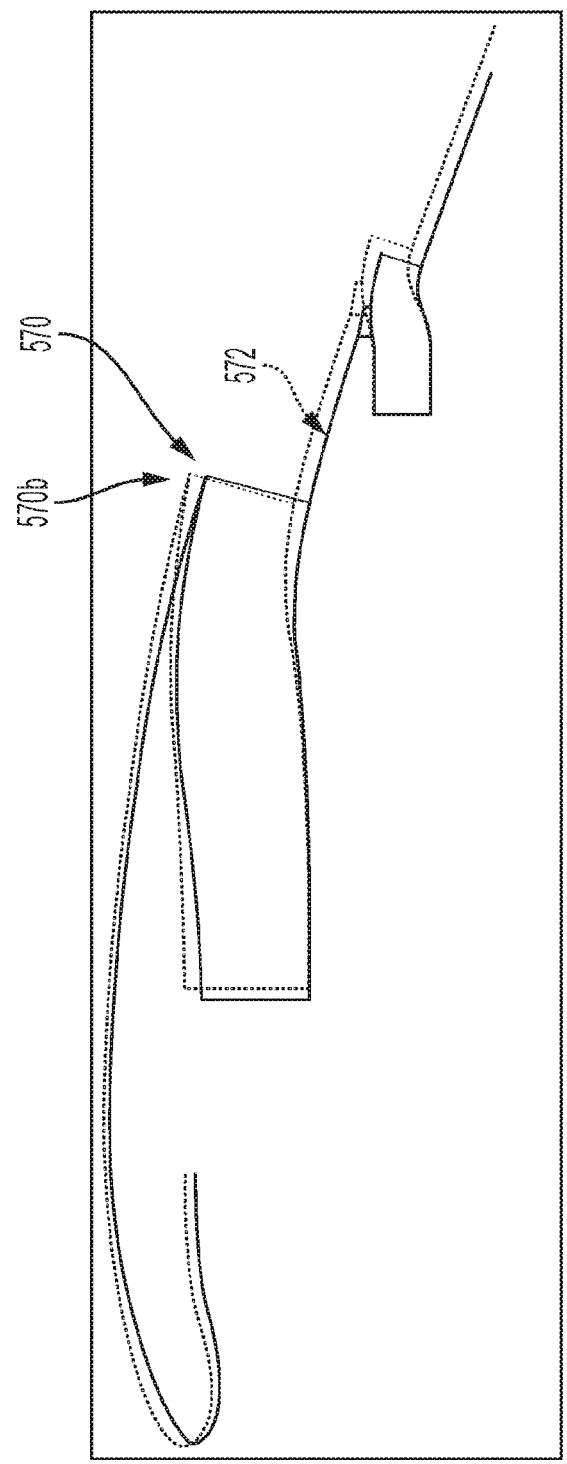
FIG. 5C illustrates how the curved portion enables a tighter wrap (solid line) around the engine core, according to one or more examples, as compared to without the curved portion (solid line).

FIG. 5C shows that the engine core section surfaces 572 can be made larger in order to compensate for the increased drag of the steeper boat tail 570. However this adds considerable weight and cost. Using an OFS 406 having a curved portion 502 as described herein overcomes this problem and enables an external nacelle 552 having steeper boat-tail 570b that maintains a tight wrap while at the same time decreasing or mitigating drag due to flow separation. Specifically, for the same aerodynamic drag, the curved portion enables an external nacelle 552 having a steeper boat tail 570b and tighter wrap around the engine core 506 as compared to the boat-tail 570 and wrap of an external nacelle without the curved portion 502. Thus, FIGS. 5B and 5C can further amplify the value of a tight wrap enabled by the shorter engine, but with steeper boat-tail curvatures as compared to the shorter engine described above with reference to FIG. 3.

Example Performance

Figures 6A, 6B:
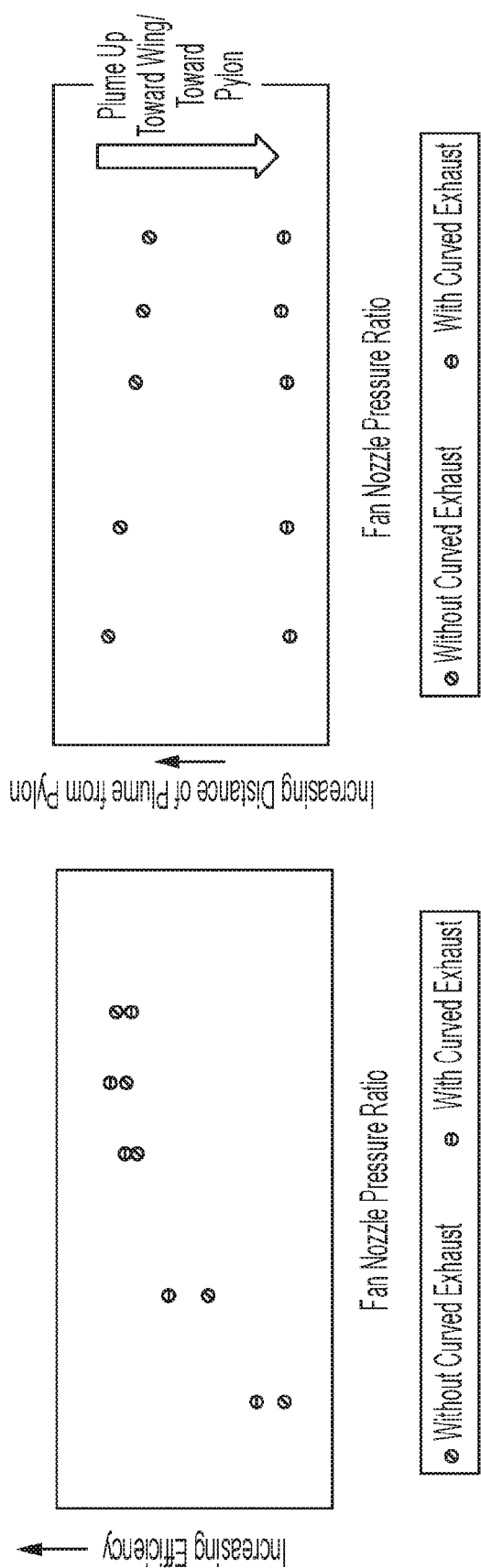
FIG. 6A plots efficiency as a function of fan nozzle pressure ratio for the nacelle with curvature as illustrated in FIG. 4 and FIG. 5A, and without the curvature (as illustrated in FIG. 3), and FIG. 6B plots increasing shift of the exhaust plume towards the pylon as a function of fan nozzle pressure ratio, for the nacelle with curvature as illustrated in FIG. 4 and FIG. 5, and without the curvature (as illustrated in FIG. 3).

FIG. 6A-6B illustrate that the exhaust 400 having a curved portion 502 (e.g., bend or sheared exhaust) toward the pylon 516 maintains thrust efficiency for the turbofan engine 500 and improves thrust vectoring without significant degradation to the fan exhaust flow 702b.

Figure 7:
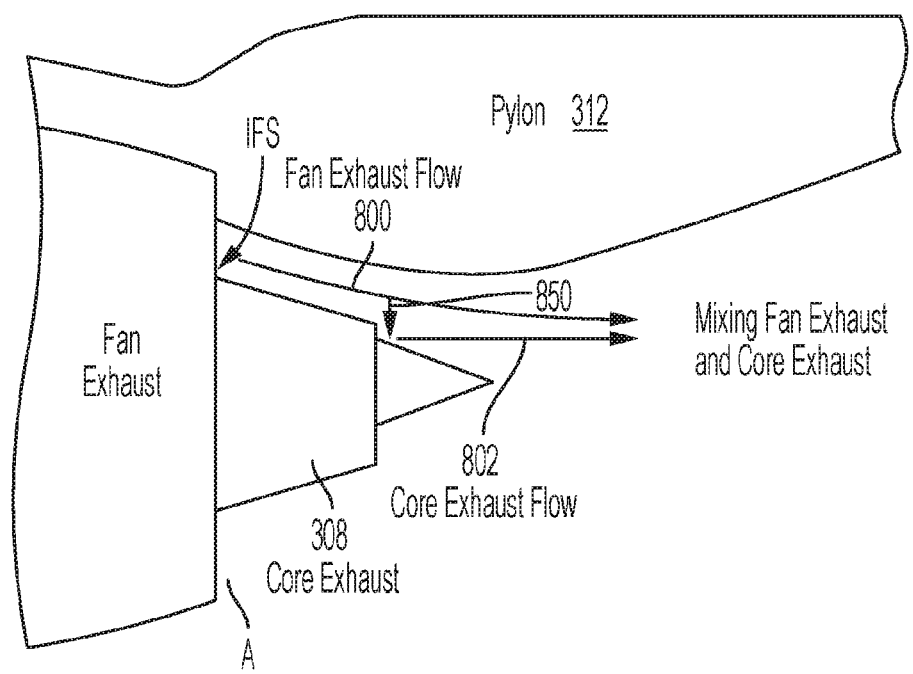
FIG. 7 illustrates a simulation of sub-optimal thrust vectoring achieved using a turbofan engine housed in the nacelle of FIG. 2. Turbulent kinetic energy determined from the Shear Stress Transport (SST) model illustrates a higher degree of mixing or interference in the flow streams (a central element in the noise signature) for the non-curved nacelle of FIG. 2.

FIG. 7 illustrates the interaction between the fan exhaust flow 800 exiting external nacelle 306 and the primary flow comprising core exhaust flow 802 exiting the core exhaust nozzle 308 for a turbofan engine 300 having a nacelle 302 without the curved portion 502 (having upward bend with curvature C) and with a tighter wrap (as illustrated by solid lines in FIG. 3). The fan exhaust flow 800 and the core exhaust flow 802 interact so as to form a shear layer that produces an acoustic signature typical of nozzle-jet noise.

Figure 8:
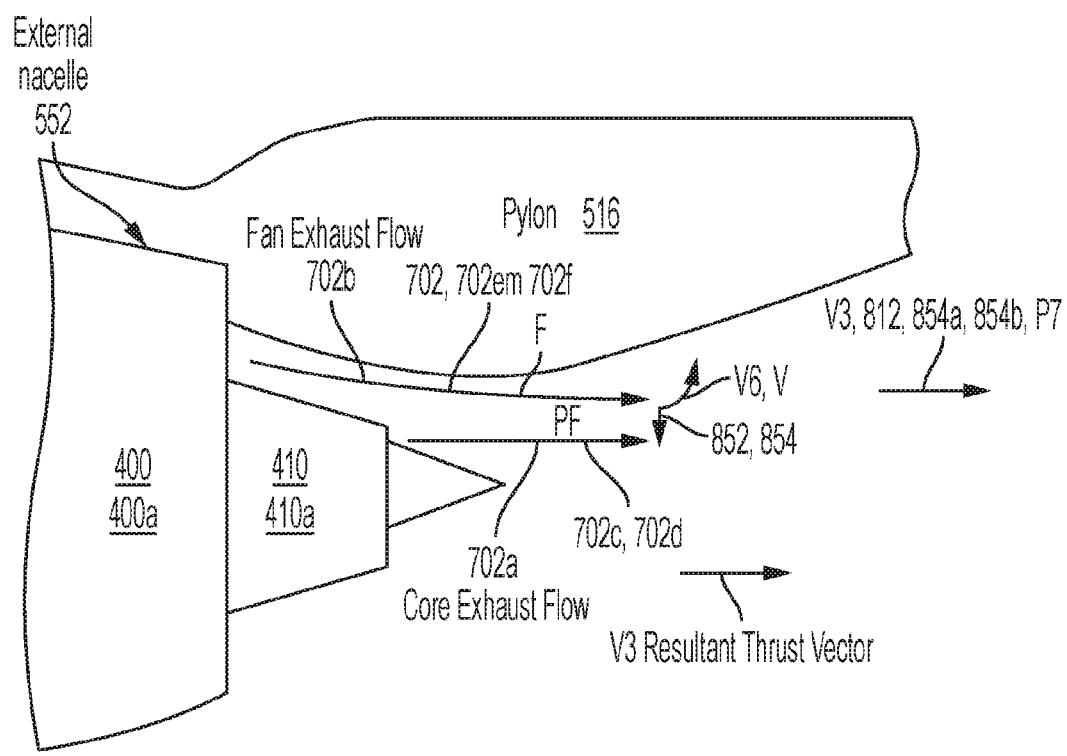
FIG. 8 illustrates simulation of the thrust vectoring achieved using the turbofan engine housed in the nacelle of FIG. 4 and FIG. 5A, demonstrating the thrust vector in FIG. 8 is more aligned with the aft direction (e.g., more parallel with the engine's longitudinal axis AA'). Alignment of the thrust vector is modeled using Reynolds Averaged Navier-Stokes simulations using the SST (Shear Stress Transport) turbulence model. The reduction in jet noise (i.e., community noise or high power operations noise) using the nacelle of FIG. 4 is implied by the reduction in turbulent kinetic energy in the shear layer determined from the flow solution modeling.

Moreover, the pylon causes interference (deflection 850) of the fan exhaust flow 800 away (e.g. downwards) from the pylon A conventional solution would be to increase area A of the fan duct below the core exhaust 308 and furthest from the pylon 312 to redistribute flow away from the pylon, thereby reducing the turning tendencies. Indeed, this can work but the present disclosure has found this is not highly sensitive. Shearing or turning the fan nozzle sleeve (and OFS) upwards or towards the pylon, as described herein (and reducing fan duct area A below the pylon) would seem contrary, putting more fan exhaust flow 800 over the pylon that would then be expected to be deflected downwards. Surprisingly, however, FIG. 8 shows the curved portion 502 comprising upward bend having curvature C shifts the fan exhaust flow 702b so that the fan exhaust flow 702b now propagates more in line with the engine's longitudinal axis AA', just like the primary flow (core exhaust flow 702a). Hence, the interference between the fan exhaust flow 702b and core exhaust flow 702a is reduced. In one or more embodiments, the curved portion 502 comprising bend or curvature C applies a vector shift V to the exhaust gas 702 that increases alignment of the thrust vector V3 and/or flow F2 in an aft direction parallel to a longitudinal axis AA' of the turbofan engine 500 and/or flight direction of the aircraft. In one or more examples, reduced mixing or interaction of the fan exhaust flow 702b and core exhaust flow 702a reduces noise downstream of the fan nozzle 400a.

Second Example

Figure 9A:
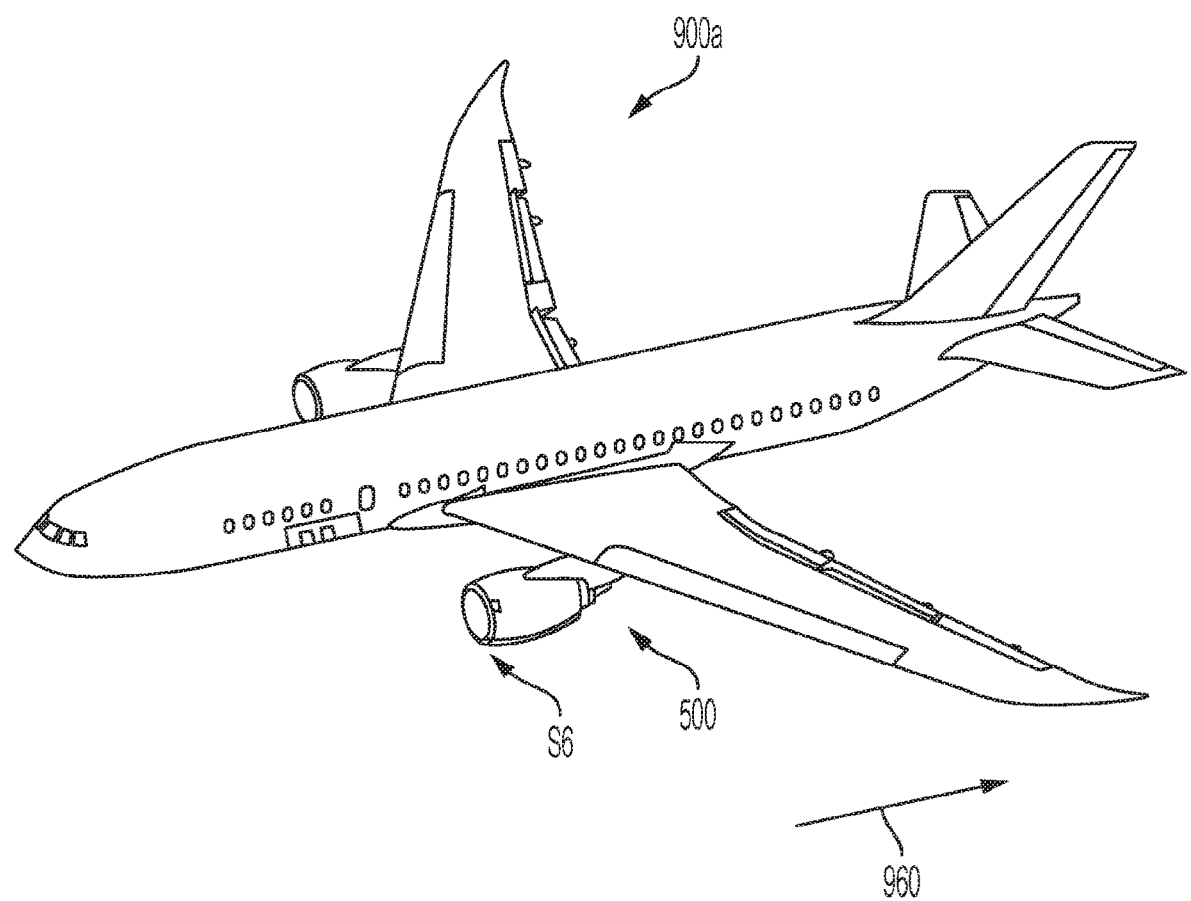
FIG. 9A illustrates an example wherein the turbofan engine is mounted on a wing and FIG. 9B illustrates an example wherein the turbofan engine is mounted on a fuselage of an aircraft.
Figure 9B:
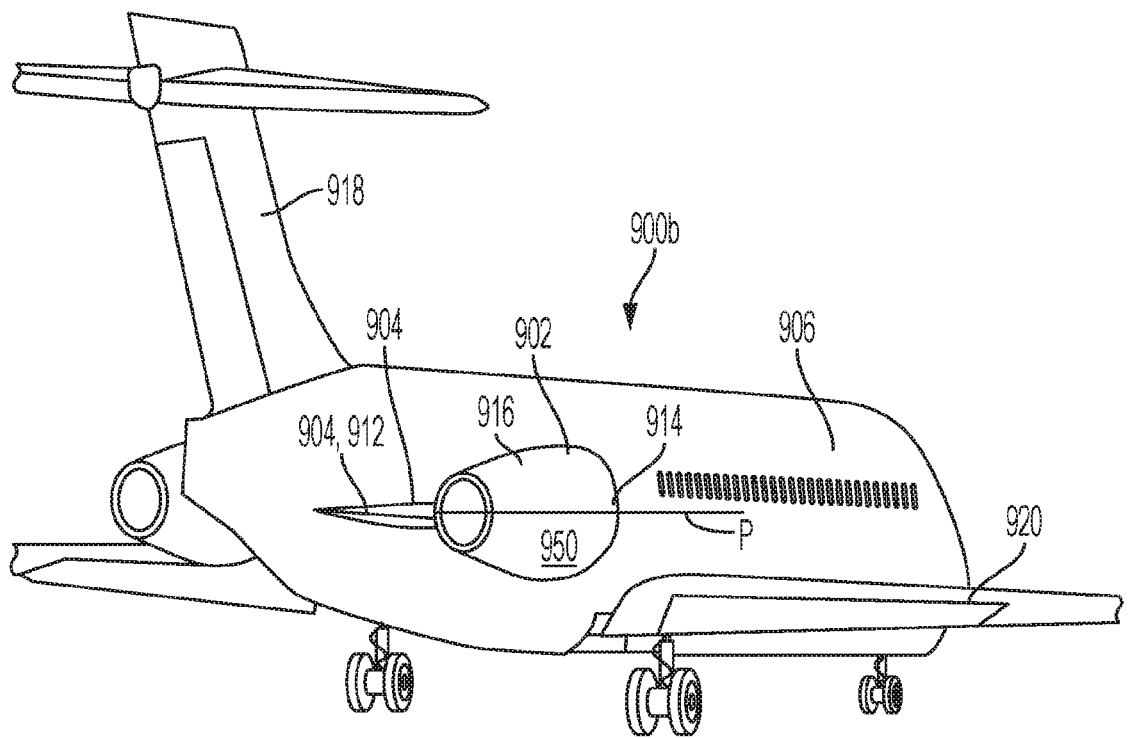

The exhaust 400 (e.g. sheared exhaust) is not limited to applications on a turbofan engine 500 on a wing 920 as illustrated in FIG. 9A. FIG. 9B illustrates an example of an aircraft 900b including an engine 902 including nacelle 916 mounted using pylon 904 to the fuselage 906. The engine 902 includes the exhaust 400 having a curved portion 502 as illustrated in FIG. 10A or FIG. 10B.

Third Example (Referring Also to FIGS. 4, 5A, 8, 9A, and 9B)

Figure 10A:
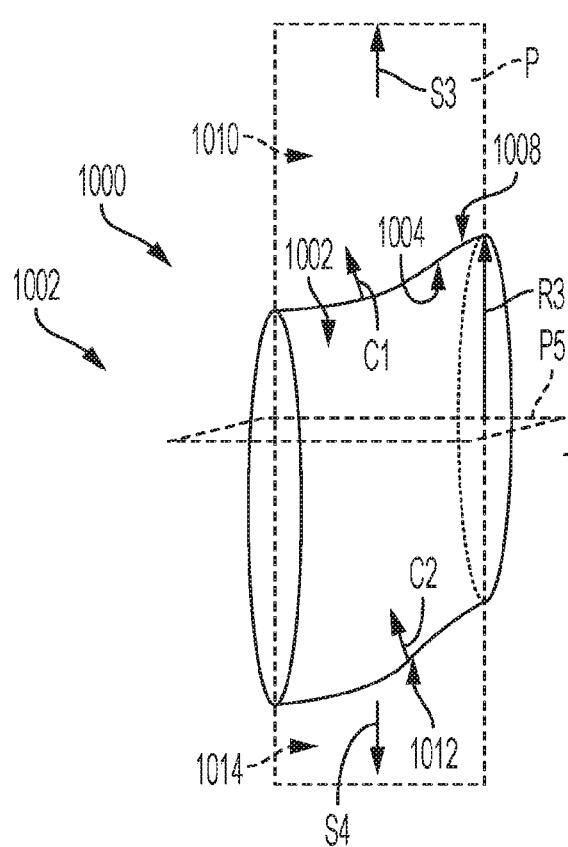
FIG. 10A and FIG. 10B illustrate nozzles according to embodiments described herein.

FIG. 10A illustrates an exhaust 1000 for a nacelle 916, 402, comprising a nozzle 1002 having a first curved surface 1008 curving away from a longitudinal axis AA' of the nacelle 916, 402 on a first side 1010 of the nozzle 1002 closer to a pylon 904 attached to the nacelle 916; and a second curved surface 1012 curving towards the longitudinal axis AA' on a second side 1014 opposite the first side 1010. The first curved surface 1008 has a first radius of curvature C1, the second curved surface 1012 has a second radius of curvature C2, the first radius of curvature C1 and the second radius of curvature C2 both lie in a plane P forming a cross section through the nozzle 1002 and a pylon 904, 516 attached to the nacelle 402, 916, and the first radius of curvature C1 is larger than the second radius of curvature C2.

Figure 10B:
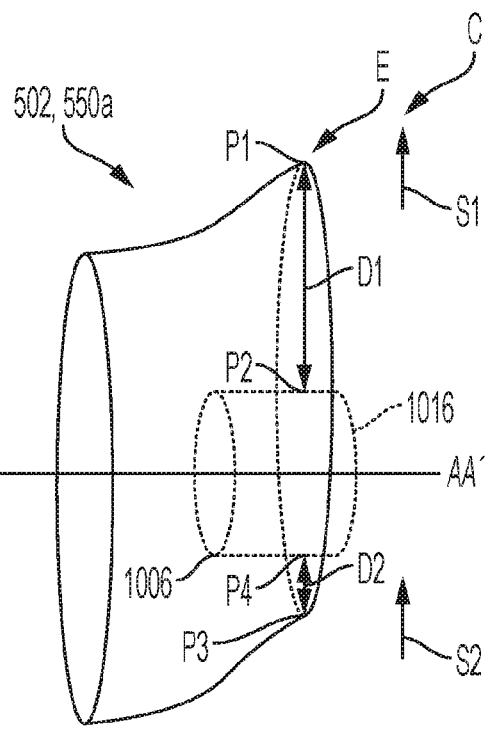

FIG. 10B illustrates the nozzle 1002 (e.g., fan nozzle or thrust reverser sleeve) including a curved portion 502 so that when the nozzle 1002 is disposed around a body 1016 (e.g., center body or core nozzle), flow F of gas G (e.g., air from a propulsor such as a fan 508 or engine core 506 as illustrated in FIG. 5A and FIG. 8) between the nozzle 1002 and the body 1016 is bounded by an OFS 1004 on the nozzle and an IFS 1006 on the body 1016:

1. A first distance D1 between a first point P1 on the OFS 1004 and a second point P2 on the IFS 1006 is larger or longer than a second distance D2 between a third point P3 on the OFS 1004 and a fourth point P4 on the IFS 1006.

2. A pylon 516, 904 attached to the nacelle is closer to the first point P1 than the third point P3 (e.g., the first distance D1 is in a first region R1 between the pylon 904, 516 and the body 1016 and the second distance D2 is in a second region R2 between the body and a section S6 of the outer surface 408 of the nacelle 402 that faces away from the aircraft 900a, 900b).

In both FIGS. 10A and 10B, a plane P5 perpendicular to the plane P defines the first side 1010 closer to the pylon 516, 904 on one side of the plane P5 and the second side 1014 on the opposite side of the plane P5 facing away from the aircraft 900a, 900b.

In both FIGS. 10A and 10B, the curved portion 502 (first curved surface 1008 and second curved surface 1012) shift the exhaust gas 702 outputted from the nozzle 1002 in a direction V (see FIG. 5 and FIG. 8) counteracting deflection 854 of the exhaust gas 702 (or exhaust 702f of gas G) away from the pylon 516, the deflection 854 caused by the pylon 516 during flight and/or take-off of the aircraft 900a, 900b propelled using the nozzle 1002. The curved portion 502 (first curved surface 1008 and/or the second curved surface 1012) can shift the exhaust gas so as to increase alignment of flow F2 of the exhaust gas 702 from the nozzle in an aft direction 854a parallel to a flight direction 854b of the aircraft and/or the longitudinal axis AA' of an engine 500 comprising the nozzle 1002. As a result, in one or more embodiments noise (e.g., community noise) experienced downstream of the nozzle 1002 is reduced and/or the fuel consumed in the engine core 506 connected to the core nozzle 411a is decreased.

In one or more examples, the first curved surface 1008 and the second curved surface 1012 both shift a trailing edge E of the nozzle 1002 by 1%-2% of a diameter 518 of the nozzle as measured at the trailing edge and/or the first curved surface and the second curved surface are within a last 25% of a length of the external nacelle.

As illustrated herein, the radius R3 of the nozzle 1002 at the trailing edge E of the nozzle 1002 can vary around the circumference of the nozzle 1002. The cross-section at the trailing edge E can have a variety of shapes (e.g., circular, elliptical, or other shapes). Also shown in FIGS. 10A and 10B are shear directions S3 and S4.

When the nacelle 916 is mounted using pylon 904 to the fuselage 906 using pylon 904, the pylon 904 turns some of the exhaust flow sideways. The sideways exhaust flow is not providing lift and creates useless side thrust that must be counteracted by the engine on the other side or aircraft flight controls. Using an exhaust with curved portion 502 and curvature C as illustrated in FIG. 4 and FIG. 5A, the exhaust gas 702 can be pointed in the direction 854b of flight so as to improve airplane efficiency.

More generally, the exhausts 400, 1000 illustrated herein comprise a curved portion 502 having a curvature that shifts flow F2 (e.g., fan exhaust flow 702b) of gas G exiting through the exhaust 400 in a direction V6 that counteracts displacement 855 and/or interruption I or interference I2 of the flow F2 by a structure 912 (e.g., pylon 904, wing 920, fuselage 906) attached to the nacelle 402 so as to better align the flow F2 with the direction 854b of flight and/or the longitudinal axis AA' of the engine 500 and/avoid interference I2 of the flow F2 with the aircraft 900a, 900b.

Thus, as described herein, the nozzles of FIGS. 10A and 10B can be implemented in nacelles housing a variety of engines and positioned in a variety of locations on the aircraft. When the nacelle is mounted on a wing, the portion of the exhaust deflected downwards by the pylon contributes to the lift, albeit less efficient than the wing (a wing produces lift most efficiently). However, because some of the exhaust is not pointed in the direction of flight, power setting of the engine must be increased to recover thrust needed to maintain flight speed. Surprisingly, using a curved exhaust 400 as described herein to produce vector alignment of the thrust and point the exhaust effectively in the direction 854b of flight (and let the wing do the lifting) configures the aircraft for increased (e.g., maximum) efficiency (e.g., at least 0.25% improvement in efficiency).

In one or more embodiments, the optimal vector shift V of the exhaust caused by curved portion 502 (first curved surface 1008 and/or second curved surface 1012) is so that the resultant thrust vector V3 (sum of V and deflection 854 caused by pylon 516) is substantially in the direction 854b of flight.

In one or more embodiments the structure 912 is a pylon 904 and the curved portion 502 having curvature C shifts flow F2 of gas G exiting the exhaust 400 away from the pylon 904 so as to avoid interference I of the flow F2 with the aircraft 900b.

In one or more embodiments, when the exhaust 1000 is attached to an aircraft 900a, 900b comprising a wing 920, the curved portion 502 shifts a plume P7 comprising the gas G upwards to counter: (1) deflection 854 of the plume P7 downwards from a direction 854b of flight of the aircraft 900a, 900b, the deflection 854 due to an incidence 960 of the wing relative to the direction 854b of flight, and/or (2) the structure 912 comprising a pylon 904, 516 deflecting or causing the deflection 854 the plume P7 away from the direction 854b of flight.

Process Steps

Figure 11:
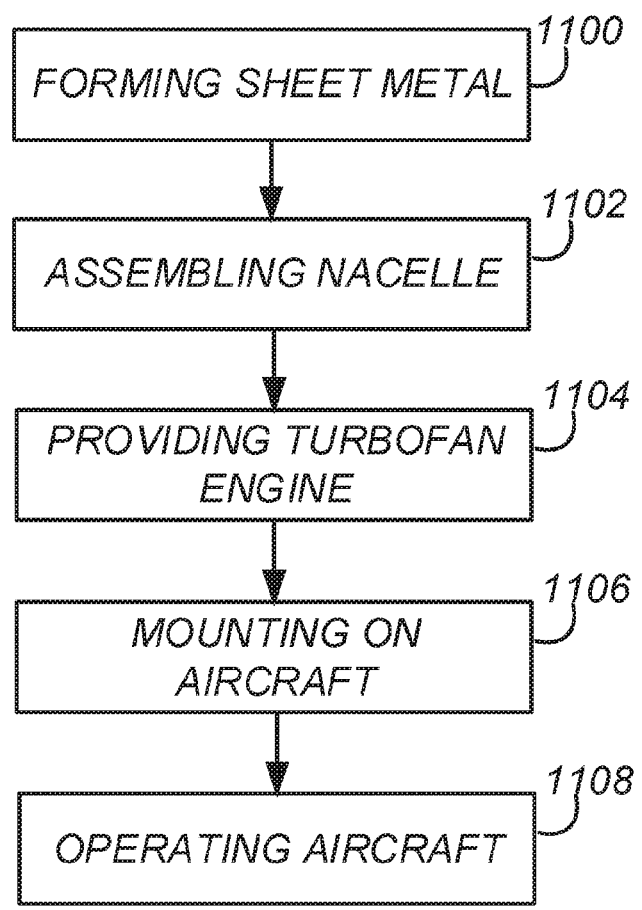
FIG. 11 is a flowchart illustrating a method of making and operating a turbofan engine housed in a nacelle according to one or more examples described herein.

FIG. 11 is a flowchart illustrating a method of making a nacelle 402 for housing an engine 902, and operating an aircraft 900a, 900b with the engine 902 (referring also to FIG. 4, FIG. 5A-5C, FIG. 7, FIGS. 8A-8B, FIG. 9A, 9B, FIG. 10A, and FIG. 10B).

Block 1100 represents forming an exhaust 400.

The nacelle's 402, 916 exhaust 400 can be embodied in many ways including, but not limited to, the following.

1. The exhaust 400 including a curved portion 502 and a nozzle 1002 so that, when the nozzle 1002 is disposed around a body (e.g., core exhaust 411 or core nozzle 411a, e.g., as found in a turbofan engine 500, 902) and flow F of the gas G between the nozzle and the body is bounded by an OFS on the exhaust 400 and an IFS on the body 1006:

a. a first distance D1 between a first point P1 on the OFS 406 and a second point P2 on the IFS 410 is larger than a second distance D2 between a third point P3 on the OFS 406 and a fourth point P4 on the IFS 410;

b. The first distance D1 is in a first region R1 between the pylon 516, 904 and the core exhaust 411; and the second distance D2 is in a second region R2 between the core exhaust and a section S5 of the outer surface of the nacelle 402 facing away from the aircraft 900a, 900b propelled using the engine. In one or more examples, a volume of the fan duct 514 in the first region R1 or first side 1010 on an attach side of the pylon 516 is larger than a volume of the fan duct 514 in the second region R2 or second side 1014 opposite the first region R1 or first side 1010; and/or c. the pylon 904 attached to an exterior 914 of the nacelle 402, 916 is closer to the first point P1 than the third point P3.

2. The exhaust 400 of embodiment 1, wherein the first point P1, the second point P2, the third point P3, and the fourth point are collinear, P2 is between P4 and P1; P4 is between P2 and P3; and the curved portion is curved (e.g., outward) in a direction having a vector V2 component collinear with a vector V1 from P2 to P1; and 3. The exhaust of embodiments 1 or 2 wherein the bend or curved portion 502 includes a first shift S1 in a position of the first point P1 by approximately 1.5% (e.g., 1-2%) of a diameter 518 of the exhaust 400 (e.g., 1.5%-2.5% or 1%-2% of the diameter 518), as measured at the trailing edge E of the exhaust 400, and a second shift S2 in a position of the third point P3 by approximately 1.5% (e.g., 1-2%) of the diameter 518 of the exhaust 400 (e.g., 0.5%-1.5% of the diameter 518), as measured at the trailing edge E of the exhaust 400. In one or more examples, the first shift and the second shift are relative to the positions of the first point P1 and the third point P3, respectively, in a case where the exhaust 400 and the core exhaust 411 are concentric or the first distance D1 is equal to the second distance D2. In one or more examples, D1 is 1-2% longer and D2 is 1-2% shorter relative to what D1 and D2 would have been had the core nozzle been centered on the engine's longitudinal axis AA' or center line.

4. The exhaust 400 of embodiments 1, 2, or 3 wherein bend or curved portion 502 includes a bend (e.g., upward bend 502a) in the direction of the pylon so that the first distance D1 is between the first point P1 at a top T1 of the OFS 406 and the second point P2 at a top T2 of the IFS 410 or core exhaust 411, and the second distance D2 is between the third point P3 at a bottom B1 of the OFS 406 and the fourth point P4 at a bottom B2 of the IFS 410.

5. The exhaust 400 of embodiment 4, wherein the curved portion 502 (upward bend 502a) includes a first shift S1 upwards or outwards of the top T1 of the OFS 406, the first shift S1 is approximately 1.5% (e.g., 1-2%) of a diameter 518 of the exhaust 400, as measured at the trailing edge E of the exhaust 400, a second shift S2 upwards of the bottom B1 of the OFS 406, and the second shift S2 is approximately 1.5% (e.g., 1-2%) of the diameter 518 of the exhaust 400, as measured at the trailing edge E of the exhaust 400. In one or more examples, the first shift S1 and the second shift S2 are measured as compared to the positions P1-P4 when the exhaust 400 and the core exhaust 506 are concentric (dashed line in FIG. 5A).

6. The exhaust of one or any combination of embodiments 1-5, wherein the bend or curved portion 502 counteracts or neutralizes a pressure field PF created by the pylon, the pressure field PF deflecting the thrust vector V3 of the thrust 812, and the bend or curved portion 502 increases alignment of the thrust vector V3 in an aft direction parallel to a longitudinal axis AA' of the turbofan engine 500, 902.

7. The exhaust 400 of one or any combination of embodiments 1-6, wherein the exhaust 400 comprises a shear forming the bend or curved portion 502 (e.g., the exhaust 400 comprises a shear S3, S4 in a plane P forming a cross section through the pylon 516, 904 and the exhaust 400 and the shear forms the curved portion 502).

8. The exhaust 400 of one or any combination of embodiments 1-7, wherein the forming comprises shearing a metal tube 550 so as to form a sheared tube 550a including the bend or curved portion 502.

9. The exhaust 400 of one or any combination of embodiments 1-8, wherein the forming comprises forming sheet metal into the exhaust 400, so that the OFS 406 includes the bend or curved portion 502 (e.g., forming shifts S1 and S2 that are 1-2% of the exhaust's diameter 518).

10. The exhaust of one or any combination of embodiments 1-9, wherein the bend or curved portion 502 in the exhaust 400 allows better performing, smaller radius exhaust center-bodies to be utilized, thereby increasing thrust 812 outputted from the exhaust 400 for a given fuel consumption.

In one or more examples, the fan duct outer wall comprising the fan nozzle 400a and including the curved portion 502 comprises a composite structure.

Block 1102 represents optionally assembling the exhaust 400 with an inlet 504 so as to form a nacelle 402. In one or more examples, the nacelle 402 further includes a fan cowl and thrust reversers.

The nacelle 402 can be embodied in many ways including, but not limited to, the following.

11. The nacelle 402 configured to include the inlet 504 and the exhaust 400.

12. The nacelle 402 including the bend or curved portion 502 of one or any combinations of embodiments 1-11, wherein the bend or curved portion 502 is in a rear half H of the fan nozzle 400a.

13. In one or more embodiments the nacelle comprises an external nacelle 552 and the curved portion is entirely within the last 25% of the length L1 of the external nacelle (referring to FIG. 5A).

14. The nacelle 402 including the bend or curved portion 502 of one or any combination of embodiments 1-13, wherein a radius R3 (half of diameter 518) of the exhaust 400 at the trailing edge E of the exhaust 400 is smaller as compared to the nacelle 302 without the bend or curved portion 502. Block 1104 represents providing an engine 902 (e.g., turbofan engine 500) including an engine core 506 housed in the nacelle 402, the engine core 506 comprising or connected to a core nozzle 411a; a fan 508 housed in the nacelle 402 so as to draw a first portion of air 510 through the inlet 504 into the engine core 506 and draw a second portion the air 512 through the inlet 504 into a fan duct 514 between the engine core 506 and the nacelle 402. The fan duct has an OFS 406 on the nacelle and an IFS 410 opposite the OFS, so that the OFS 406 and the IFS 410 bound the flow F of the second portion of the air 512. The first portion of air 510 is used to burn fuel in the engine core 506 so as to form first exhaust gases 702d exhausted through the core exhaust 411 (e.g., nozzle 411a) and generating a first component of thrust 812. The second portion of air 512 is exhausted as second exhaust gases 702e through the exhaust 400 of the nacelle 402 so as to generate a second component of thrust 812. The curved portion 502 shifts the second exhaust gases (or applies a vector shift V to the second exhaust gases) in a direction so as to counteract deflection of the second exhaust gases 702e caused by the pylon 516 during flight and/or take-off of the aircraft 900a. More specifically, the outer flow surface 406 includes a curved portion 502 having a curvature C such that a first distance D1 between a first point P1 at a trailing edge E on the outer flow surface 406 and a second point P2 on the inner flow surface 410 is larger than a second distance D2 between a third point P3 on the trailing edge E of the outer flow surface 406 and a fourth point P4 on the inner flow surface 410; the first distance D1 is in a first region R1 between the pylon 516 and the core exhaust 411; the second distance D2 is in a second region R2 between the core exhaust 411 and a section S5 of the nacelle 402 facing away from an aircraft 900a propelled using the engine 500.

In one or more examples, the bend or curved portion 502 of the OFS 406 is such that, at a given thrust 812 generated by the engine 902 (e.g., turbofan engine 500), noise experienced downstream of the engine 902 is reduced and/or the fuel consumed in the engine core 506 is decreased, In one or more examples, the vector shift V improves aircraft fuel efficiency on the order of 0.5% (e.g., by 0.5% or at least 0.5%).

The turbofan engine 500, 902 can be embodied in many ways including, but not limited to, the following.

15. The turbofan engine 500, 902 including the bend or curved portion 502 of one or any combination of embodiments 1-14, wherein the bend or curved portion 502 increases alignment of a thrust vector V3 of the thrust 812 in an aft direction parallel to a longitudinal axis AA of the turbofan engine 500, 902.

16. The turbofan engine of one or any combination of embodiments 1-15, the engine comprises a geared turbofan engine and the nacelle 402 forms a tighter wrap around the engine core 506 as compared to the nacelle 302 without the curved portion, thereby reducing aerodynamic drag of the engine 500, 902.

Block 1106 represents mounting one or more of the engines 902 (e.g., turbofan engines 500) on an aircraft 900a, 900b using the pylon 904, 516 using a structure 912.

17. The turbofan engine 500, 902 of one or any combination of embodiments 1-16, wherein the structure 912 is a mount comprising a pylon 516 attaching the nacelle 400 to a wing 920.

18. The turbofan engine of one or any combination of embodiments 1-16, wherein the structure 912 is a pylon 904 attached to the nacelle 400 and attaching the nacelle 400 to a fuselage 906 or an empennage 918.

19. Although embodiments of the present invention are illustrated in connection with a turbofan engine, the nacelle including the curvature C or curved portion 502 (e.g., bend) can also be used to house any engine (e.g., propeller engine or rocket engine) whose output thrust may be deflected by the pylon attaching the nacelle to the aircraft.

Block 1108 represents optionally operating an aircraft powered by the engine 902.

The curvature C or curved portion 502 (e.g., shear) better aligns the fan exhaust flow 702b with the longitudinal axis AA of the engine 500 and/or flight direction 854b. Shear (e.g., curvature C or curved portion 502) can be used to vector fan exhaust flow 702b toward or away from the pylon.

In one or more embodiments, the curvature C or curved portion 502 (e.g., bend) applies a vector shift V3 to the second exhaust gases in a direction so as to counteract deflection of the second exhaust gases caused by the pylon during flight and/or take-off of the aircraft (e.g., neutralizing the pressure field downstream of the fan nozzle, thereby allowing the fan flow to propagate aft along the engine axis, with a collateral benefit of (in one or more examples) less mixing with the primary exhaust and providing jet noise reduction. Thus, in one or more examples, at a given thrust, the upward bend or curved portion 502 reduces noise experienced downstream of the turbofan engine and/or decreases fuel consumed in the engine core. In one or more examples, the bend or curved portion 502 in the fan nozzle 400a reduces fuel burn by 0.25%-0.75% (e.g., when D1 and D2 change by −1 inch and −1 inch respectively). In one or more examples, the bend or curved portion 502 also alleviates adverse pressure on the crown line of the nacelle.

In other embodiments, the curvature C or curved portion can be configured to deflect or vector fan exhaust flow 702b toward the aircraft 900a, 900b (for instance, to compensate for wing upwash) so as to increase alignment of the fan exhaust flow with the direction of flight.

In yet further embodiments, the curvature C or curved portion 502 can be configured to deflect or vector the fan exhaust flow away from the pylon to avoid interference with the airplane.

Although the nacelle 402 can solve drag problems caused using a tighter wrap with short propulsion systems (e.g., geared turbofans), nozzle performance improvements in thrust efficiency and thrust vectoring, as well as acoustic benefits, have also been observed in long (non-geared turbofan) engines and may also be applicable to all types of engines generally.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An aircraft comprising:
a wing and an engine,
the engine comprising:
a nacelle comprising an inlet;
a pylon attached to the nacelle;
an engine core housed in the nacelle, the engine core connected to a core exhaust;
a fan housed in the nacelle so as to draw a first portion of air through the inlet into the engine core and draw a second portion of the air through the inlet into a fan duct between the engine core and the nacelle; and
wherein:
the fan duct has an outer flow surface on the nacelle and an inner flow surface opposite the outer flow surface, the outer flow surface and the inner flow surface bounding a flow of the second portion of the air;
the first portion of air is used to burn fuel in the engine core so as to form a first exhaust gas exhausted through the core exhaust;
the fan duct comprises a fan exhaust and the second portion of the air is exhausted as a second exhaust gas through the fan exhaust, wherein the second exhaust gas generates a thrust comprising a thrust vector; and
the outer flow surface comprises a curved portion such that:
a first distance between a first point at a trailing edge on the outer flow surface and a second point on the inner flow surface is larger than a second distance between a third point on the trailing edge of the outer flow surface and a fourth point on the inner flow surface,
the first distance is in a first region between the pylon and the core exhaust;
the second distance is in a second region between the core exhaust and a section of the nacelle facing away from an aircraft propelled using the engine; and
the curved portion applies a shift to the second exhaust gas in a first direction counteracting:
a first deflection of the second exhaust gas away from a second direction propelling the aircraft in a direction of flight, the first deflection caused by an aircraft structure including the pylon, wherein the second direction is aligned with the direction of flight, and
a second deflection of the second exhaust gas downwards from the second direction, the second deflection due to an incidence of the wing relative to the direction of flight,
so as to increase alignment the thrust vector with the second direction and compensate for a wing upwash.

2. The aircraft of claim 1, wherein:
the curved portion includes:
a first shift in a first position of the first point by 1%-2% of a diameter of the fan exhaust, as measured at the trailing edge,
a second shift in a second position of the third point by 1%-2% of the diameter of the fan exhaust, as measured at the trailing edge, and
the first shift and the second shift are relative to the first position of the first point and the second position of the third point, respectively, when the fan exhaust and the core exhaust are concentric or the first distance is equal to the second distance.

3. The aircraft of claim 2, wherein the nacelle comprises an external nacelle and the curved portion is in a last 25% of a length of the external nacelle.

4. The aircraft of claim 1, wherein the fan exhaust comprises a fan nozzle and a shear in a plane forming a cross section through the pylon and the fan nozzle, so that the shear forms the curved portion.

5. The aircraft of claim 1, wherein the engine comprises a geared turbofan engine and the nacelle forms a tighter wrap around the engine core as compared to the nacelle without the curved portion, thereby reducing aerodynamic drag of the engine.

6. The aircraft of claim 1, wherein the pylon is for attaching the nacelle to the wing.

7. The aircraft of claim 6, wherein:
the curved portion of the outer flow surface including an upward bend so that:
the first distance is between the first point at a top of the outer flow surface and the second point at a top of the inner flow surface,
the second distance is between the third point at a bottom of the outer flow surface and the fourth point at a bottom of the inner flow surface, the upward bend includes:
a first shift upwards of the top of the outer flow surface of 1%-2% of a diameter of the fan exhaust, as measured at the trailing edge,
a second shift upwards of the bottom of the outer flow surface of 1%-2% of the diameter of the fan exhaust, as measured at the trailing edge.

8. The aircraft of claim 1, wherein the shift reduces noise experienced downstream of the aircraft during take-off of the aircraft.

9. A method of making an aircraft comprising:
attaching a wing and an engine, the engine comprising:
a nacelle comprising an inlet;
a pylon attached to the nacelle;
an engine core housed in the nacelle, the engine core connected to a core exhaust;
a fan housed in the nacelle so as to draw a first portion of air through the inlet into the engine core and draw a second portion of the air through the inlet into a fan duct between the engine core and the nacelle; and
wherein:
the fan duct has an outer flow surface on the nacelle and an inner flow surface opposite the outer flow surface, the outer flow surface and the inner flow surface bounding a flow of the second portion of the air;
the first portion of air is used to burn fuel in the engine core so as to form a first exhaust gas exhausted through the core exhaust;
the fan duct comprises a fan exhaust and the second portion of the air is exhausted as a second exhaust gas through the fan exhaust, wherein the second exhaust gas generates a thrust comprising a thrust vector; and
the outer flow surface comprises a curved portion such that:
a first distance between a first point at a trailing edge on the outer flow surface and a second point on the inner flow surface is larger than a second distance between a third point on the trailing edge of the outer flow surface and a fourth point on the inner flow surface,
the first distance is in a first region between the pylon and the core exhaust;

the second distance is in a second region between the core exhaust and a section of the nacelle facing away from an aircraft propelled using the engine; and the curved portion applies a shift to the second exhaust gas in a first direction counteracting:

a first deflection of the second exhaust gas away from a second direction propelling the aircraft in the direction of flight, the first deflection caused by an aircraft structure including the pylon and wherein the second direction is aligned with the direction of flight, and a second deflection of the second exhaust gas downwards from the second direction, the second deflection due to an incidence of the wing relative to the direction of flight, so as to increase alignment of the thrust vector with the second direction and compensate for a wing upwash.

10. The method of claim 9, further comprising:
providing the curved portion including:
a first shift in a first position of the first point by 1%-2% of a diameter of the fan exhaust, as measured at the trailing edge,
a second shift in a second position of the third point by 1%-2% of the diameter of the fan exhaust, as measured at the trailing edge, and
the first shift and the second shift are relative to the first position of the first point and the second position of the third point, respectively, when the fan exhaust and the core exhaust are concentric or the first distance is equal to the second distance.

11. The method of claim 10, further comprising providing the nacelle comprising an external nacelle and the curved portion is in a last 25% of a length of the external nacelle.

12. The method of claim 9, wherein the fan exhaust comprises a fan nozzle and a shear in a plane forming a cross section through the pylon and the fan nozzle, so that the shear forms the curved portion.

13. The method of claim 9, wherein the engine comprises a geared turbofan engine and the nacelle forms a tighter wrap around the engine core as compared to the nacelle without the curved portion, thereby reducing aerodynamic drag of the engine.

14. The method of claim 9, wherein:
the curved portion of the outer flow surface including an upward bend so that:
the first distance is between the first point at a top of the outer flow surface and the second point at a top of the inner flow surface,
the second distance is between the third point at a bottom of the outer flow surface and the fourth point at a bottom of the inner flow surface,
the upward bend includes:
a first shift upwards of the top of the outer flow surface of 1%-2% of a diameter of the fan exhaust, as measured at the trailing edge,
a second shift upwards of the bottom of the outer flow surface of 1%-2% of the diameter of the fan exhaust, as measured at the trailing edge.

15. The method of claim 9, wherein the shift reduces noise experienced downstream of the aircraft.

16. A method of operating an aircraft comprising:
operating the aircraft comprising a wing and an engine, the engine comprising:
a nacelle comprising an inlet;
a pylon attached to the nacelle;
an engine core housed in the nacelle, the engine core connected to a core exhaust;
a fan housed in the nacelle so as to draw a first portion of air through the inlet into the engine core and draw a second portion of the air through the inlet into a fan duct between the engine core and the nacelle; and
wherein:
the fan duct has an outer flow surface on the nacelle and an inner flow surface opposite the outer flow surface, the outer flow surface and the inner flow surface bounding a flow of the second portion of the air;
the first portion of air is used to burn fuel in the engine core so as to form a first exhaust gas exhausted through the core exhaust;
the fan duct comprises a fan exhaust and the second portion of the air is exhausted as a second exhaust gas through the fan exhaust, wherein the second exhaust gas generates a thrust comprising a thrust vector; and
the outer flow surface comprises a curved portion such that:
a first distance between a first point at a trailing edge on the outer flow surface and a second point on the inner flow surface is larger than a second distance between a third point on the trailing edge of the outer flow surface and a fourth point on the inner flow surface,
the first distance is in a first region between the pylon and the core exhaust;
the second distance is in a second region between the core exhaust and a section of the nacelle facing away from an aircraft propelled using the engine; and
the curved portion applies a shift to the second exhaust gas in a first direction counteracting:
a first deflection of the second exhaust gas away from a second direction propelling the aircraft in the direction of flight, the first deflection caused by an aircraft structure including the pylon and wherein the second direction is aligned with the direction of flight, and
a second deflection of the second exhaust gas downwards from the second direction,
the second deflection due to an incidence of the wing relative to the direction of flight,
so as to increase alignment of the thrust vector with the second direction and compensate for a wing upwash.

17. The method of claim 16, wherein:
the curved portion includes:
a first shift in a first position of the first point by 1%-2% of a diameter of the fan exhaust, as measured at the trailing edge,
a second shift in a second position of the third point by 1%-2% of the diameter of the fan exhaust, as measured at the trailing edge, and
the first shift and the second shift are relative to the first position of the first point and the second position of the third point, respectively, when the fan exhaust and the core exhaust are concentric or the first distance is equal to the second distance.

18. The method of claim 16, wherein the nacelle comprises an external nacelle and the curved portion is in a last 25% of a length of the external nacelle and the fan exhaust comprises a fan nozzle and a shear in a plane forming a cross section through the pylon and the fan nozzle, so that the shear forms the curved portion.

19. The method of claim 16, wherein the engine comprises a geared turbofan engine and the nacelle forms a tighter wrap around the engine core as compared to the nacelle without the curved portion, thereby reducing aerodynamic drag of the engine.

20. The method of claim 16, wherein:
the curved portion of the outer flow surface including an upward bend so that:
the first distance is between the first point at a top of the outer flow surface and the second point at a top of the inner flow surface,
the second distance is between the third point at a bottom of the outer flow surface and the fourth point at a bottom of the inner flow surface,
the upward bend includes:
a first shift upwards of the top of the outer flow surface of 1%-2% of a diameter of the fan exhaust, as measured at the trailing edge,
a second shift upwards of the bottom of the outer flow surface of 1%-2% of the diameter of the fan exhaust, as measured at the trailing edge.

21. The method of claim 16, further comprising operating the aircraft so as to take advantage of the shift reducing noise experienced downstream of the aircraft.

\* \* \* \* \*